Sept. 30, 1969 S. M. C. V. SIMON 3,470,425

LOCK-OUT CIRCUIT ARRANGEMENT

Filed Oct. 10, 1966

United States Patent Office 3,470,425

Patented Sept. 30, 1969

3,470,425

LOCK-OUT CIRCUIT ARRANGEMENT

Stephane Marcel Clement Victor Simon, Brussels, Belgium, assignor to International Standard Electric Corporation Filed Oct. 10, 1966, Ser. No. 585,576
Claims priority, application Netherlands, Oct. 15, 1965, 6513416
Int. Cl. H01h 47/02
U.S. Cl. 317—137 21 Claims

ABSTRACT OF THE DISCLOSURE

These lock-out circuit arrangements include a plurality of bistable devices. The bistable devices are associated in a manner such that when an attempt is made to switch one or more devices from their first to their second condition, only one device can be switched. This improved lock-out circuit arrangement is capable of successfully performing a lock-out operation between at least 500 bistable devices.

The invention relates to lock-out circuit arrangements generally and particularly to lock-out circuit arrangements including a plurality of bistable devices so associated that upon an attempt to switch one or more devices from their first to their second condition, only one device can be switched.

Such lock-out circuit arrangements are already generally known and it is an object of the present invention to provide an improved lock-out circuit arrangement capable of successfully performing a lock-out operation between at least 500 bistable devices.

The lock-out is accomplished in one preferred circuit arrangement in accordance with the invention in that each of said bistable devices is switched subsequent to an associated individual oscillator having been started. The oscillators are prevented from oscillating when any one of the bistable devices is switched.

The above mentioned and other objects and features of the invention will become more apparent and the invention itself will be best understood by referring to the following description of embodiments taken in conjunction with the accompanying drawings wherein.

Figure 1:
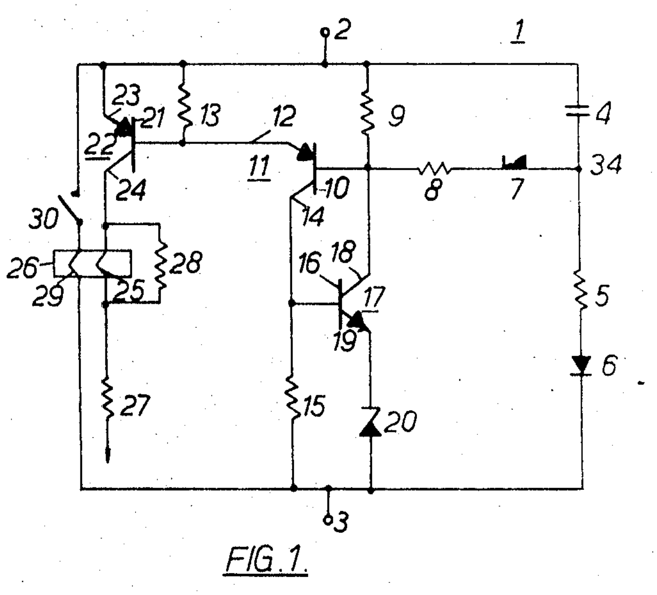
FIG. 1 shows a bistable device forming part of a lock-out circuit arrangement according to the invention.

Principally referring to FIG. 1 the bistable device 1 shown therein has two terminals 2 and 3 between which the capacitor 4, the resistor 5 and the diode 6 are branched in series. Capacitor 4 is shunted by the series connection of the dipole element 7 and the resistors 8 and 9. The junction point of the resistors 8 and 9 is connected to the base 10 of the PNP transistor 11 which forms a first gating arrangement. The emitter 12 of transistor 11 is connected to terminal 2 through resistor 13, whereas its collector 14 is connected, on the one hand, to terminal 3 via resistor 15 and, on the other hand, directly to the base 16 of the NPN transistor 17 which constitutes a second gating arrangement. The collector 18 of transistor 17 is connected to the base 10 of transistor 11, whereas its emitter 19 is connected to terminal 3 through Zener diode 20. The emitter 12 of transistor 11 is also connected to the base 21 of the PNP transistor 22, the emitter 23 of which is connected to terminal 2 and the collector 24 of which is connected to the negative pole of a DC source via the series connection of the right hand winding 25 of a reed relay 26 and the resistor 27. The latter winding is shunted by the resistor 28. The left hand winding 29 of relay 26 has a low impedance and is connected in series with the make contact 30 of reed relay 26 between the terminals 2 and 3.

It may be said that a relaxation oscillator is branched between the terminals 2 and 3 and is constituted by a capacitor charging circuit and by a capacitor discharging circuit. The capacitor charging circuit includes the capacitor 4, the resistor 5 and the diode 6 which are connected in series. The capacitor discharging circuit is constituted by the closed loop including the series connection of capacitor 4, dipole element 7, resistor 8, and resistor 9 shunted by the series connected base-emitter junctions of the transistors 11 and 22. Thus, the junction point of the resistors 8 and 9 constitutes the output of the relaxation oscillator.

In a preferred embodiment the values of the elements 4, 5, 8, 9, 13, 15, 27 and 28 are the following: 0.1 microfarad, 51 kilo-ohms, 1 kilo-ohm, 3 kilo-ohms, 51 ohms, 330 ohms, 1 kilo-ohm and 820 ohms respectively. The resistance value of the low impedance winding 29 is 245 ohms. The dipole element 7 normally has a relatively high impedance and switches to a relatively low impedance condition when a predetermined reverse potential of about 30 volts is applied across its terminals. This dipole is for instance an element with a negative impedance characteristic, of the type disclosed in the U.S. Patents 2,655,600 and 2,855,524. Finally, the Zener diode 20 breaks down when a reverse voltage of 8 to 9 volts is applied across its terminals.

Figure 2:
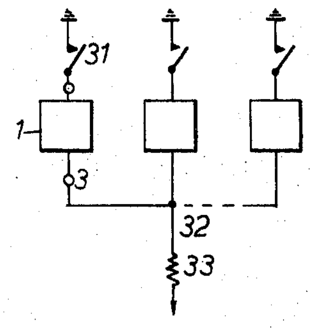
FIG. 2 represents a first embodiment of such a lock-out arrangement.

Principally referring to FIG. 2 a plurality of the above described bistable devices 1 form part of a lock-out circuit arrangement wherein terminal 2 of each bistable device is coupled to the grounded positive pole of a DC source, for example, of 48 volts via an individual make contact 31. The terminals 3 of all these bistable devices are joined together at the junction point 32 which is connected to the negative pole of this DC source via the resistor 33 which may be considered as the series impedance of the source.

With the above given values of the elements, the resistor 33 preferably has a value of 820 ohms. From the above it follows that a plurality of bistable devices 1 may be operatively connected in parallel across the DC source, each by the closure of an individual make contact 31. The above lock-out circuit arrangement can be considered as a double test circuit wherein a plurality of devices 1 may try to test the same terminal 32.

Figure 3:
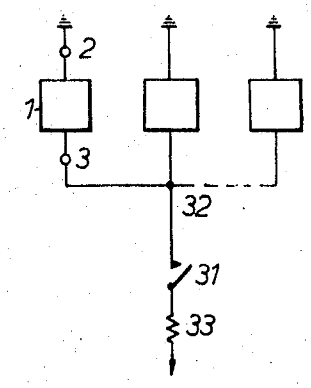
FIG. 3 shows a second embodiment of such a lock-out circuit arrangement.

Principally referring to FIG. 3 a plurality of the above described devices 1 form part of a lock-out circuit arrangement wherein terminal 2 of each bistable device is connected to the grounded positive pole of a DC source of 48 volts, for example. The terminals 3 of all these bistable devices are joined together at the junction point 32 which is connected to the negative pole of the DC source via the make contact 31 and the resistor 33 which may be considered as the series impedance of this source. With the above given values of the elements, the resistor 33 preferably has a value of 820 ohms. From the above it follows that a plurality of bistable devices 1 is operatively connected in parallel across the DC source by the closure of the common make contact 31.

When a single bistable device is connected with its terminals across the terminals of the above DC source of 48 volts having the series resistance 33, this device is operated as described hereinafter.

The capacitor 4 is charged in the following circuit: ground, terminal 2, capacitor 4, resistor 5, diode 6, terminal 3, resistor 33, negative pole of the source of D.C. voltage. Consequently the potential of the junction point 34 of the capacitor 4 and the resistor 5 exponentially decreases from ground towards the voltage value. During the potential decrease from ground the operating negative voltage of the dipole element 7 presents a high impedance and prevents a current flow from ground to the negative pole of the DC source via the resistors 9 and 8. But at the moment the potential of the above junction point 34 decreases below the operating negative voltage of the dipole, i.e. when the dipole element 7 is submitted to a reverse potential difference larger than in the example given 30 volts, it switches to its low impedance condition. Consequently, the capacitor 4 suddenly discharges through the resistor 8, the base-emitter junctions of transistors 11 and 22 in series, terminal 2, ground.

Part of the discharge current flows in resistances 9 and 13, which shunt the above base-emitter junctions to avoid an unnecessarily high current to flow in these junctions. After a predetermined time interval dependent on the time constant of the discharge circuit the discharge current drops below the minimum sustaining current of the dipole element 7, the latter is then reset to its high impedance condition wherein it interrupts the flow of any discharge current. But before this happens the discharge current causes transistors 11 and 22 to become conductive and to saturate, so that a current flows from ground to terminal 2 to the negative pole of the DC source via the emitter-base junction of transistor 22, the emitter and collector of transistor 11, resistor 15, terminals 3 and 32 and resistor 33.

If the potential drop produced by current in resistor 15 exceeds the sum of the voltage drops across the base emitter junction of transistor 17 and the Zener diode 20, part of the current flow causes transistor 17 in turn to become conductive and to saturate. The resulting collector current of transistor 17 is injected into the base 10 of transistor 11. The latter remains saturated even after the discharge current of capacitor 4 has stopped flowing.

This would not have been the case should the potential drop in resistor 15 be insufficient to overcome the sum of the breakdown voltage of the Zener diode 20 and of the voltage drop in the base-emitter junction of transistor 17. Indeed, in such a case no current can flow either in this base-emitter junction or, of course, in its collector 18 so that the transistors 11 and 22 remain under the exclusive control of the discharge current of capacitor 4 and hence switch to being non-conductive at the very moment the discharge current is interrupted. This short conduction period of transistor 22 is completely insufficient to energize relay 26.

Further, considering the case wherein the three transistors 22, 11 and 17 have been saturated, the potential prevailing between the terminals 2 and 3 or 32 is reduced to the sum of the potential drops in the emitter-base junctions of these transistors 22, 11, 17 and in the Zener diode 20. This sum potential is equal to about 10 volts within the exemplary values given. From that moment on, any other bistable device connected to terminal 32 is prevented from being operated since the sum potential between its terminal 2 and terminal 32 is insufficient to set the dipole element 7 to the low impedance condition. The dipole element requires 30 volts for being triggered with the given exemplary values.

The transistor 22 is saturated, the relay 26 is operated in the following circuit: ground, terminal 2, emitter 23 and collector 24 of transistor 22, winding 25 of relay 26, resistor 27, and battery. The winding 25 is shunted by resistor 28.

By the closure of contact 30 the left hand low impedance widing 29 of relay 26 is connected across the terminals 2 and 3 causing the current flowing in the bistable device to drop to or near to zero and to reset the bistable device to its inoperative condition. The relay 26 is relatively slow to release because of the shunt resistor 28. This arrangement avoids keeping the relay 26 operated under the exclusive control of the bistable device which may be reset to its inoperative condition by even very short duration spurious signals appearing at the terminal 32. The relay when held operated over its own contact 30 cannot be affected by such spurious signals.

The operation of the lock-out circuit arrangement will now be described in case a plurality of bistable devices, say *m*, are simultaneously connected in parallel across the voltage source by the closure of the individual contacts 31, as in FIG. 2 or of the common contact 31 as in FIG. 3. For simplification purposes it is supposed that, in case of FIG. 2, no further bistable devices become connected across the voltage source during this operation. The capacitors 4 of these *m* bistable devices start charging simultaneously. The dipole elements of these *m* bistable devices and the constituent elements 4, 5, 6, 33 of the charging circuits of these deivces are in general not all identical so that the individual dipole elements are in general triggered to their low impedance condition at different moments. In case the dipole element 7 of a single bistable device is switched to its low impedance condition, the latter bistable device is switched to its operative condition in the manner described above. The potential of the junction point 32 is raised, due to the switching of the bistable to its operative condition thus preventing the further charging of the capacitors 4 of the other $m-1$ bistable devices. In case, however, the dipole elements of $n$ ($>2$) of the $m$ bistable devices are simultaneously switched to the low impedance condition, the charged capacitors 4 thereof are discharged in the manner described above. Due to this, the transistors 11 and 22 of these $n$ bistable devices become conductive so that in each of these bistable devices a short current pulse flows from ground to the negative pole of the DC source in the following circuit: ground, terminal 2, emitter-base junctions of transistors 22 and 11, resistors 15 and 33, and the negative pole of DC source. The total current flowing through the resistor 33 raises the potential of the terminal 32 to a value preventing the dipole elements of the other $m-n$ bistable devices from being triggered.

From the above it follows that a first discrimination has ben realized among the *m* bistable devices by the different charging times of the charging circuits and the different triggering voltages of the dipole elements 7.

Since the above *n* bistable devices are connected in parallel across the voltage source, it is clear that in each bistable device the current through resistor 33 when *n* bistables are connected across the voltage source is considerably smaller than the current flowing through resistor 33 when a single bistable device is connected across the voltage source. The values of the elements have been so calculated that the voltage drop produced across the resistor 15 by the current, even when $n=2$, is smaller than the breakdown voltage of the Zener diode (9 volts with the exemplary values given). Consequently, in each of the *n* bistable devices the transistor 17 is not rendered conductive. It should also be noted that a short current pulse flows through relay 26 but is insufficient to operate the relay.

Since the constituent elements of the discharging circuits and the dipole elements of these *n* bistable devices are in general not completely identical, these dipole elements are reset to their high impedance condition at different moments, thus blocking the associated pair of transistors 11 and 22.

When it is supposed that the pairs of transistors 11 and 22 of the above *n* bistable devices are successively blocked, the current flowing through the resistor 15 of each of the bistable devices of which the pair of transistors 11 and 22 is still conductive is increased each time the pair of transistors 11, 22 of a bistable device is blocked. At the moment the transistors 11 and 22 of the $(n-1)$th bistable device have been blocked the voltage drop across the resistor 15 of the *n*th bistable device becomes sufficient to render the associated transistor 17 conductive, so that finally only this *n*th bistable device remains operated. All other bistable devices are then prevented from being operated owing to the low potential difference prevailing between the common test terminal 32 and ground.

From the above it follows that a second discrimination among the $n$ bistable devices has been realized by the different discharging times and blocking voltages of the discharging circuits and the dipole elements respectively.

When however the dipole elements 7 of $p$ of these $n$ bistable devices are blocked at different moments, while the dipole elements 7 of the remaining $n-p$ bistable dedevices are simultaneously blocked, the lock-out operation will again be started. But it is clear that the probability that $p$ is equal to 2 or more is very small so that one is practically sure that only one bistable device is finally in the operated condition.

As explained above in the case where the dipole elements 7 of $n$ ($n>2$) out of $m$ bistable devices have been triggered simultaneously, none of these $n$ bistable devices can switch due to the voltage drop in their respective resistors 15 being insufficient to render their respective transistors 17 conductive. The only consequence of such an operation is that a very short current pulse flows through the associated transistors 11 and 22 and relay 26. The relay 26 however is not operated by this current pulse, since it is too short.

In this explanation, the fact that after the potential of the terminal 32 has been raised to a value preventing the dipole elements 7 of the other $m$-$n$ bistable devices to be triggered, the capacitors 4 of the latter bistable devices start discharging was not explained. Without the diode 6 the discharge currents of the capacitors 4 would flow through their associated resistor 5 and the resistors 15 and transistors 12 and 22 of the $n$ bistable devices, thus momentarily reinforcing the current flowing in these resistors 15. This additional current might render the transistors 17 of these $n$ bistable devices momentarily conductive and so prolong the conductive state of the transistors 11 and 22 of these $n$ bistable devices. Such an erroneous operation is avoided by the diode 6 which in each bistable device prevents discharge current from flowing from capacitor 4 to terminal 3.

It has been found that the above described lock-out arrangement is capable of successfully performing a lock-out operation between a very large number of bistable devices, e.g., at least 500.

While the principles of the invention have been described above in connection with specific apparatus, it is to be clearly understood that this description is made only by way of example and not as a limitation on the scope of the invention.

I claim:

1. A lockout circuit arrangement wherein a plurality of bistable devices are associated so that upon an attempt to switch one or more open bistable devices from a first to a second condition only one of the bistable devices can be switched, each of said bistable devices comprising relaxation oscillator means, means for switching said bistable devices subsequent to said oscillator having been started, and means for preventing all of said oscillators from oscillating when any one of said bistable devices is switched to its second condition 2. The lock-out circuit arrangement of claim 1, wherein each of said bistable devices having two terminals, impedance means for operatively connecting said devices in parallel across a voltage source, said series impedance having a value such that the current flowing through any of said bistable devices when two or more are operatively connected in parallel across said voltage source is insufficient to cause any of said bistable devices from switching to said second condition.

3. The lock-out circuit arrangement of claim 2, characterized in that, said voltage source is a DC source.

4. A lock-out circuit arrangement wherein a plurality of bistable devices are associated so that upon an attempt to switch one or more open bistable devices from a first to a second condition only one of the bistable devices can be switched, each of said bistable devices comprises oscillator means, means for switching said bistable devices subsequent to said oscillator having been started, means for preventing all of said oscillators from oscillating when any one of said bistable devices is switched to its second condition, each of said bistable devices having two terminals, impedance means for operatively connecting said devices in parallel across a D.C. voltage source, said series impedance having a value such that the current flowing through any of said bistable devices when two or more are operatively connected in parallel across said voltage source is insufficient to cause any of said bistable devices from switching to said second condition, each of said oscillators is a relaxation oscillator which is branched across the said terminals of the associated bistable device, and means for starting said relaxation oscillator when the associated bistable device is operatively connected across said voltage source.

5. The lock-out circuit arrangement of claim 4 wherein each of said bistable devices includes a normally blocked first gating arrangement controlled by the output of said oscillator so that upon the oscillator output reaching a predetermined value said first gating arrangement is unblocked allowing a current to flow through the bistable device.

6. The lock-out circuit arrangement of claim 5, wherein each of said bistable devices includes a first impedance, means coupling said first impedance to a normally blocked second gating arrangement, said first impedance having such a value that said second gating arrangement can only be unblocked when said current reaches a predetermined value that can only be reached when only one of the first gating arrangements of the bistable devices is unblocked.

7. The lock-out circuit arrangement according to claim 6 characterized in this, in each of said bistable devices said predetermined value is determined by a normally blocked bias control element included in said second gating arrangement.

8. The lock-out circuit arrangement according to claim 7 characterized in that, said bias control element is a Zener diode.

9. The lock-out circuit arrangement of claim 8 wherein said first gating arrangement comprises a first transistor of a first conductivity type, and said second gating arrangement comprises a second transistor of a second conductivity type, means coupling the emitter of said first transistor to one of the two terminals of the said bistable device, means connecting the base and the collector to the output of said oscillator and to the base of said second transistor respectively, means for connecting the collector of said second transistor to the base of the first transistor, and means for coupling the base and emitter of said second transistor to the other terminal of the bistable devices via said impedance and said Zener diode respectively.

10. The lock-out circuit arrangement of claim 9, wherein said relaxation oscillator is constituted by a capacitor charging circuit and by a capacitor discharging circuit, that said capacitor charging circuit includes a capacitor and a first resistor, connected in series between the terminals of the associated bistable device, and that said capacitor discharging circuit is constituted by a closed loop including the series connection of said capacitor, a dipole element and a second impedance, the junction point of said dipole element and said second impedance constituting the output of said oscillator, said dipole element normally having a relatively high impedance, and means responsive to a predetermined potential being developed across its terminals for switching said dipole to a relatively low impedance condition.

11. The lock-out circuit arrangement according to claim 10, wherein said dipole element has a negative impedance characteristic.

12. The lock-out circuit arrangement according to claim 11, wherein said dipole is a PNPN diode.

13. The lock-out circuit arrangement according to claim 12 including a third transistor, means for connecting the emitter of said first transistor to the base of said third transistor, second resistor means for connecting the said base of said third transistor to said one terminal, and means for connecting the emitter of said third transistor to said one terminal, and collector to a voltage source.

14. The lock-out circuit arrangement according to claim 13, wherein said second impedance is constituted by the base-emitter junctions of said first and third transistors.

15. The lock-out arrangement of claim 14, wherein a third resistor is branched in parallel with said series connected base-emitter junctions.

16. The lock-out circuit arrangement according to claim 15 wherein a fourth resistor is branched in parallel with the base-emitter junction of said third transistor.

17. The lock-out circuit arrangement according to claim 16 wherein relay means are provided, means including a first winding of said relay for connecting said collector of said third transistor to said voltage source.

18. The lock-out circuit arrangement of claim 17 wherein said relay comprises a second winding which is connected in series with a make contact of the relay across the terminals of the bistable device, said second winding having such a low impedance that the bistable device in its second condition is switched back to its first condition when said make contact is closed.

19. The lock-out circuit arrangement according to claim 18, wherein the first winding of said relay is shunted by a fifth resistor.

20. The lock-out circuit arrangement according to claim 19 wherein said relay is a reed relay.

21. The lock-out circuit arrangement according to claim 20 wherein said capacitor charging circuit includes a diode, means for connecting said diode in a branch circuit so as to be conductive upon said bistable device being operatively connected across said voltage source.

References Cited

UNITED STATES PATENTS 3,311,795 3/1967 Gilbert ------------- 317—137

JOHN F. COUCH, Primary Examiner

DENNIS J. HARNISH, Assistant Examiner

U.S. Cl. X.R.

317—146